United States Patent
Oshiro et al.

(10) Patent No.: US 7,395,145 B2
(45) Date of Patent: Jul. 1, 2008

(54) APPARATUS AND METHOD FOR CALCULATING INITIAL CORRECTION COEFFICIENT, AND PROGRAM FOR CALCULATING INITIAL CORRECTION COEFFICIENT

(75) Inventors: Yuji Oshiro, Kobe (JP); Minao Yanase, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 719 days.

(21) Appl. No.: 10/826,283

(22) Filed: Apr. 19, 2004

(65) Prior Publication Data

US 2004/0230349 A1    Nov. 18, 2004

(30) Foreign Application Priority Data

May 16, 2003    (JP)    ............................. 2003-138928

(51) Int. Cl.
 *B60T 7/12* (2006.01)
 *G05D 1/00* (2006.01)

(52) U.S. Cl. ............................ 701/75; 340/444; 303/173

(58) Field of Classification Search ................... 701/75; 340/444; 303/173
See application file for complete search history.

(56) References Cited

U.S. PATENT DOCUMENTS 5,699,251 A * 12/1997 Mori et al. .................. 701/97
5,803,557 A * 9/1998 Horiuchi et al. ............. 303/173
2004/0217853 A1* 11/2004 Dunbridge et al. .......... 340/444

FOREIGN PATENT DOCUMENTS

| EP | 0 657 313 A2 | 6/1995 |
|----|---|---|
| EP | 0 861 743 A2 | 9/1998 |
| JP | 7-156621 A | 6/1995 |
| JP | 9-249010 A | 9/1997 |
| JP | 10-206460 A | 8/1998 |
| JP | 10-239334 A | 9/1998 |
| JP | 10-287111 A | 10/1998 |

* cited by examiner

*Primary Examiner*—Khoi H. Tran
*Assistant Examiner*—Brian J Broadhead
(74) *Attorney, Agent, or Firm*—Birch, Stewart, Kolasch & Birch, LLP (57) ABSTRACT

An apparatus for calculating an initial correction coefficient for correcting rotational angular velocities obtained from outputs of rotational angular velocity detecting means. The apparatus includes a judged value calculating means which calculates a judged value on the basis of the rotational angular velocities; an identifying means which identifies whether the vehicle is performing turning movements at high velocity, straight-ahead running or turning movements at mid/low velocity; and an initial correction coefficient calculating means which obtains an initial correction coefficient when it has been identified by the identifying means that the vehicle is performing straight-ahead running or turning movements at mid/low velocity. It is possible to obtain accurate correction coefficients so that it is possible to accurately detect, for instance, a decrease in tire air-pressure and thus to maintain safe running.

3 Claims, 5 Drawing Sheets

APPARATUS AND METHOD FOR CALCULATING INITIAL CORRECTION COEFFICIENT, AND PROGRAM FOR CALCULATING INITIAL CORRECTION COEFFICIENT

This Non-provisional application claims priority under 35 U.S.C. § 119(a) on Patent Application No(s). 2003-138928 filed in Japan on May 16, 2003, the entire contents of which are hereby incorporated by reference.

BACKGROUND OF THE INVENTION

The present invention relates to an apparatus and a method for calculating an initial correction coefficient as well as to a program for calculating an initial correction coefficient. More particularly, it relates to an apparatus and a method for calculating an initial correction coefficient as well as to a program for calculating an initial correction coefficient which are used in an apparatus for detecting decrease in tire air-pressure (DWS) for detecting decompression of a tire on the basis of rotational (wheel speed) information of four wheel tires mounted to a vehicle or in an apparatus for calculating a slip rate which calculates a slip rate of driving wheel tires from among four wheel tires mounted to a vehicle.

An apparatus for detecting decrease in tire air-pressure (DWS) conventionally employs a theory that a rotational velocity or a rotational angular velocity of a decompressed tire is increased when compared to remaining normal tires owing to a decrease in outer diameter (dynamic load radius of the tire) from that of a tire of normal internal pressure. In a method for detecting decrease in internal pressure on the basis of a relative difference in rotational angular velocities of tires, $$DEL = \{(F1+F4)/2 - (F2+F3)/2\}/\{(F1+F2+F3+F4)/4\} \times 100(\%) \quad (1)$$

is employed as a judged value DEL (reference should be made to Japanese Unexamined Patent Publication No. 305011/1988). Here, F1 to F4 denote rotational angular velocities of a front left tire, a front right tire, a rear left tire and a rear right tire, respectively.

Since tires are manufactured to include variations (initial differences) within standards, effective rolling radii of the respective tires (a value obtained by dividing a distance which has been traveled by a single rotation by $2\pi$) are not necessarily identical to one another even though all of the tires are at normal internal pressure. This will result in variations in the rotational angular velocities Fi of the respective tires. There is known a method for eliminating influences of initial differences from rotational angular velocities Fi (reference should be made to Japanese Unexamined Patent Publication No. 249010/1997). In this method, the following initial correction coefficients K1, K2, K3 are first calculated.

$$K1 = F1/F2 \quad (2)$$

$$K2 = F3/F4 \quad (3)$$

$$K3 = (F1 + K1 \times F2)/(F2 + K2 \times F4) \quad (4)$$

By using the thus calculated initial correction coefficients K1, K2 and K3, new rotational angular velocities $F1_i$ are obtained as represented by equations (5) to (8).

$$F1_1 = F1 \quad (5)$$

$$F1_2 = K1 \times F2 \quad (6)$$

$$F1_3 = K3 \times F3 \quad (7)$$

$$F1_4 = K2 \times K3 \times F4 \quad (8)$$

Here, initial correction coefficient K1 is a coefficient for correcting differences in effect rolling radii owing to initial differences between right and left front tires. Initial correction coefficient K2 is a coefficient for correcting differences in effect rolling radii owing to initial differences between right and left rear tires. Initial correction coefficient K3 is a coefficient for correcting differences in effect rolling radii owing to initial differences between the front left tire and the right and left rear tires.

While an initial correction coefficient which is calculated on the basis of data obtained when the vehicle is performing straight-ahead running and an initial correction coefficient which is calculated on the basis of data when performing turning movements alone are different from each other, the initial correction coefficients when performing straight-ahead running and those when performing turning movements are increased and decreased by the same ratio. The initial correction coefficients have thus been obtained in the prior art by utilizing the fact that judged values when performing straight-ahead running and those when turning movements become the same values as a result of calculation by using the above equation (1).

However, variations in rotational angular velocities are caused due to influences of differences in load shift applied onto the tires during turning movements at high velocity and differences in slip rates between inner and outer wheels of the driving wheels when performing turning movements at high velocity. When calculating initial correction coefficients upon incorporating such data during turning movements at high velocity, it will accordingly be impossible to obtain accurate initial correction coefficients.

SUMMARY OF THE INVENTION

In view of the above facts, it is an object of the present invention to provide an apparatus and a method for calculating an initial correction coefficient as well as to a program for calculating an initial correction coefficient with which it is possible to obtain accurate initial correction coefficients.

According to a first aspect of the present invention, there is provided an apparatus for calculating an initial correction coefficient. The apparatus is arranged to calculate initial correction coefficients for correcting rotational angular velocities obtained from outputs of rotational angular velocity detecting means which are respectively provided in connection with four tires mounted to a vehicle and includes: a judged value calculating means which calculates a judged value on the basis of the rotational angular velocities whether an air-pressure of a tire has decreased; an identifying means which identifies, on the basis of the judged value, whether the vehicle is performing turning movements at high velocity, straight-ahead running or turning movements at mid/low velocity; and an initial correction coefficient calculating means which obtains an initial correction coefficient for eliminating a difference between effective rolling radii owing to initial differences between respective tires from the rotational angular velocities, when it has been identified by the identifying means that the vehicle is performing straight-ahead running or turning movements at mid/low velocity, wherein the identifying means includes a limit processing means which judges whether a difference or a ratio between the calculated judged value and a previously obtained reference judged value is less than a preliminarily obtained threshold or not, and a running determining means which determines, when it is determined that the value of the difference or the ratio is less than the threshold, that the vehicle is performing straight-ahead running or turning movements at mid/low velocity.

According to a second aspect of the invention, there is provided a method for calculating an initial correction coefficient in which initial correction coefficients for correcting rotational angular velocities obtained from outputs of rotational angular velocity detecting means which are respectively provided in connection with four tires mounted to a vehicle are calculated. The method includes the steps of: calculating a judged value on the basis of the rotational angular velocities whether an air-pressure of a tire has decreased; identifying, on the basis of the judged value, whether the vehicle is performing turning movements at high velocity, straight-ahead running or turning movements at mid/low velocity; and obtaining an initial correction coefficient for eliminating a difference between effective rolling radii owing to initial differences between respective tires from the rotational angular velocities, when it has been identified by the identifying means that the vehicle is performing straight-ahead running or turning movements at mid/low velocity, wherein the identifying step includes the steps of judging whether a difference or a ratio between the calculated judged value and a previously obtained reference judged value is less than a preliminarily obtained threshold or not, and of determining, when it is determined that the value of the difference or the ratio is less than the threshold, that the vehicle is performing straight-ahead running or turning movements at mid/low velocity.

According to a third aspect of the invention, there is provided a program for calculating an initial correction coefficient, wherein for calculating initial correction coefficients for correcting rotational angular velocities obtained from outputs of rotational angular velocity detecting means which are respectively provided in connection with four tires mounted to a vehicle, a computer is made to function as a judged value calculating means which calculates a judged value on the basis of the rotational angular velocities whether an air-pressure of a tire has decreased, an identifying means which identifies, on the basis of the judged value, whether the vehicle is performing turning movements at high velocity, straight-ahead running or turning movements at mid/low velocity, and an initial correction coefficient calculating means which obtains an initial correction coefficient for eliminating a difference between effective rolling radii owing to initial differences between respective tires from the rotational angular velocities, when it has been identified by the identifying means that the vehicle is performing straight-ahead running or turning movements at mid/low velocity, and further as a limit processing means which judges whether a difference or a ratio between the calculated judged value and a previously obtained reference judged value is less than a preliminarily obtained threshold or not, and a running determining means which determines, when it is determined that the value of the difference or the ratio is less than the threshold, that the vehicle is performing straight-ahead running or turning movements at mid/low velocity.

DETAILED DESCRIPTION

The apparatus and method for calculating an initial correction coefficient as well as the program for calculating an initial correction coefficient according to the present invention will now be explained on the basis of the accompanying drawings.

Figure 1:
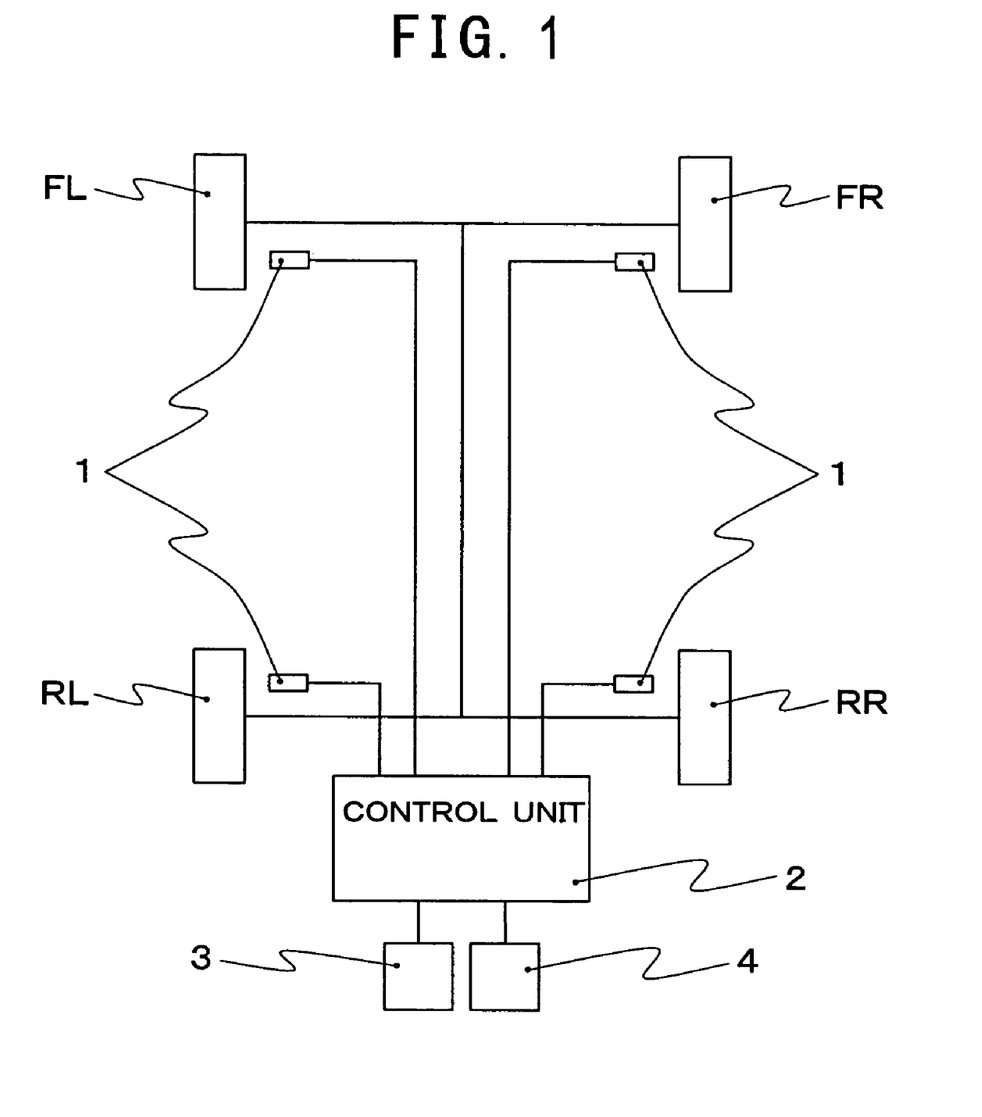
FIG. 1 is a block diagram illustrating an apparatus for detecting decrease in tire air-pressure to which one embodiment of the present invention is applied.

As illustrated in FIG. 1, the apparatus for detecting decrease in tire air-pressure to which one embodiment of the present invention is applied is for judging whether air-pressure of either of four tires FL, FR, RL and RR provided in a four-wheel-drive vehicle is decreased or not, and is composed of ordinary rotational angular velocity detecting means 1 respectively provided in relation to the respective tires.

The rotational angular velocity detecting means 1 might be a wheel speed sensor for measuring rotational angular velocities on the basis of number of pulses upon generating rotational pulses by using an electromagnetic pickup or similar, or an angular velocity sensor in which power is generated by using rotation such as in a dynamo, wherein the rotational angular velocity is measured from a voltage thereof. Outputs of the rotational angular velocity detecting means 1 are supplied to a control unit 2 which might be a computer such as an ABS. A display 3 comprising liquid crystal elements, plasma display elements or CRT for informing a tire of which the tire air-pressure has decreased, and an initialization switch 4 which might be operated by a driver when calculating initial correction coefficients K1, K2 and K3 are connected to the control unit 2. The initial correction coefficients K1, K2 and K3 are for eliminating differences in effective rolling radii owing to initial differences between respective tires from rotational angular velocities.

Figure 2:
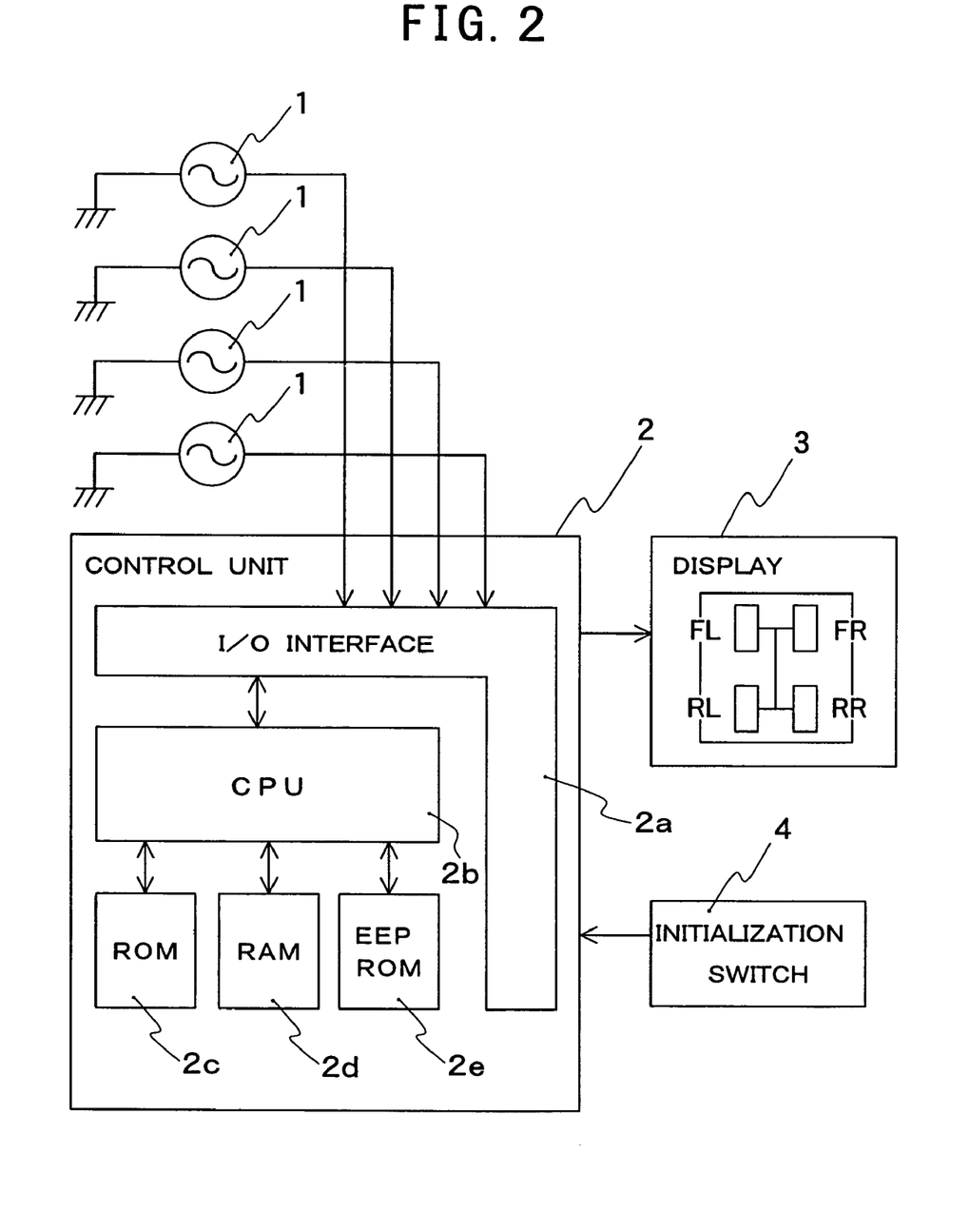
FIG. 2 is a block diagram illustrating electric arrangements of the apparatus for detecting decrease in tire air-pressure of FIG. 1.

As illustrated in FIG. 2, the control unit 2 comprises an I/O interface $2a$ required for sending/receiving signals to/from an external device, a CPU $2b$ which functions as a center of calculation, a ROM $2c$ which stores a control operation program for the CPU $2b$, and a RAM $2d$ into which data are temporally written and are read out therefrom when the CPU $2b$ performs control operations. A part of a storage region of the RAM $2d$ is used as a counter for calculating initial correction coefficients. The calculated initial correction coefficients are stored in an EEPROM $2e$.

Pulse signals corresponding to the rotational number of the tire (hereinafter referred to as "wheel speed pulse") are output in the rotational angular velocity detecting means 1. In the CPU $2b$, rotational angular velocities Fi for the respective tires are calculated on the basis of the wheel speed pulses as output from the rotational angular velocity detecting means 1 at specified sampling periods $\Delta T(sec)$, for instance, $\Delta T = 1$. Initial correction calculating processes are performed for the rotational angular velocities Fi. While processes for calculating initial correction coefficients are not particularly limited in the present invention, it is possible to calculate the initial correction coefficients K1 and K2, for example, from the following equations (9) and (10).

$$K1 = BK1 \times (N-1)/N + (F1/F2)/N \quad (9)$$

$$K2 = BK2 \times (N-1)/N + (F4/F3)/N \quad (10)$$

Here, the initial correction coefficient K1 is a coefficient for eliminating differences between effective rolling radii between right and left front tires FL and FR owing to initial differences. The initial correction coefficient K2 is a coefficient for eliminating differences between effective rolling radii between right and left rear tires RL and RR owing to initial differences. BK1 and BK2 are initial correction coefficients stored in the RAM $2d$ upon being obtained in previous sampling periods. N is a number of times of calculation for obtaining initial correction coefficients.

For judging decrease in tire air-pressure (decompression), the initial correction coefficients K1 and K2 are used for first obtaining rotational angular velocities $F1_i$ of which differences in effective rolling radii owing to initial differences between respective tires are eliminated as illustrated in the following equations (11) to (14), and it is then judged whether the air-pressure has decreased on the basis of a judged value D which has been calculated from the following equation (15). In this respect, while the rotational angular velocities are corrected by using the initial correction coefficients K1 and K2 in the present embodiment, the present invention is not limited to this, and it is also possible to correct the rotational angular velocities by using initial correction coefficients K1, K2 and K3.

$$F1_1 = F1 \quad (11)$$

$$F1_2 = K1 \times F2 \quad (12)$$

$$F1_3 = F3 \quad (13)$$

$$F1_4 = K2 \times F4 \quad (14)$$

$$DEL = \{(F1_1 + F1_4)/2 - (F1_2 + F1_3)/2\} / \{(F1_1 + F1_2 + F1_3 + F1_4)/4\} \times 100(\%) \quad (15)$$

According to the present embodiment, when performing calculation processes of the initial correction coefficients, a judged value which is to become a reference is obtained from data obtained, for instance, when the vehicle has been performing running at mid/low velocity (straight-ahead running or turning movements at mid/low velocity) other than turning movements at high velocity. However, the rotational angular velocities which are used when obtaining the reference judged value are rotational angular velocities prior to correction by the initial correction coefficients. When relational values between such a reference judged value and present judged values (for instance, differences or ratios) are deviated by not less than a specified threshold, it is determined that the vehicle is performing turning movements at high velocity, and data obtained during this period are rejected. With this arrangement, it will be possible to obtain accurate initial correction coefficients in the present embodiment so that erroneous alarm might be eliminated and safe driving might be maintained.

The apparatus for calculating an initial correction coefficient according to the present embodiment includes a judged value calculating means which calculates a judged value on the basis of the rotational angular velocities whether an air-pressure of a tire has decreased; an identifying means which identifies, on the basis of the judged value, whether the vehicle is performing turning movements at high velocity, straight-ahead running or turning movements at mid/low velocity; and an initial correction coefficient calculating means which obtains an initial correction coefficient for eliminating a difference between effective rolling radii owing to initial differences between respective tires from the rotational angular velocities, when it has been identified by the identifying means that the vehicle is performing straight-ahead running or turning movements at mid/low velocity. The identifying means further includes a limit processing means which judges whether a difference or a ratio between the calculated judged value and a previously obtained reference judged value is less than a preliminarily obtained threshold or not, and a running determining means which determines, when it is determined that the value of the difference or the ratio is less than the threshold, that the vehicle is performing straight-ahead running or turning movements at mid/low velocity.

The present embodiment is further provided with a reference judging means, wherein a reference judged value SD is obtained by performing averaging processes as illustrated in the following equation (16) by the reference judging means on the basis of the judged value D and a previously obtained judged value BD.

$$SD = D/N + BD \times (N-1)/N \quad (16)$$

Here, N denotes a number of counts (number of times of calculation) of an initialization completion percentage counter which is a first storing means for storing the number of times of calculation of the initial reference judged values.

Since the reference judged value is calculated upon performing filtering processes for eliminating noise for each sampling period $\Delta T$, the accuracy will be improved each time calculation is performed. Accordingly, identifying processes are performed after a sufficient accuracy of the reference judged value has been obtained so that a high accuracy can be achieved from the beginning on. The present embodiment is thus so arranged that a reference judged value until a sufficient accuracy is obtained is regarded as an initial reference judged value by a judged value replacing means prior to performing identifying processes in the identifying means.

The present embodiment is also provided with a number judging means which judges whether the number of times of calculation is less than a preliminarily set threshold, for instance, 10, an execution prohibiting means which performs only processes for obtaining the initial reference judged value but prohibits execution of identifying processes by the identifying means since it is determined that the accuracy of the reference judged value is still insufficient when it is determined that the number of times of calculation is less than the threshold, and a setting means which sets the initial reference judged value as a reference judged value which is first used in the identifying means.

Moreover, according to the present embodiment, the identifying means preferably includes a second storing means which stores a number of times of identification in which it is identified that the vehicle is performing turning movements at high velocity, an identification number judging means which judges whether the number of times of identification is not less than a preliminarily determined threshold or not, and an initialization executing means which initializes the initial correction coefficient when it is determined that the number of times of identification is not less than the threshold. With this arrangement, calculation of the initial correction coefficient is started afresh when the number of times in which it has been identified that the vehicle is performing turning movements at high velocity has reached the threshold so that it is possible to reliably obtain an initial correction coefficient of high accuracy.

The program for calculating an initial correction coefficient according to the present embodiment is so arranged that the control unit 2 is made to function as the judged value calculating means, the identifying means, the initial correction coefficient calculating means, the limit processing means, the running determining means, the reference judging means, the judged value replacing means, the first storing means, the number judging means, the execution prohibiting means, the setting means, the second storing means, the identification number judging means and the initialization executing means.

Figure 3:
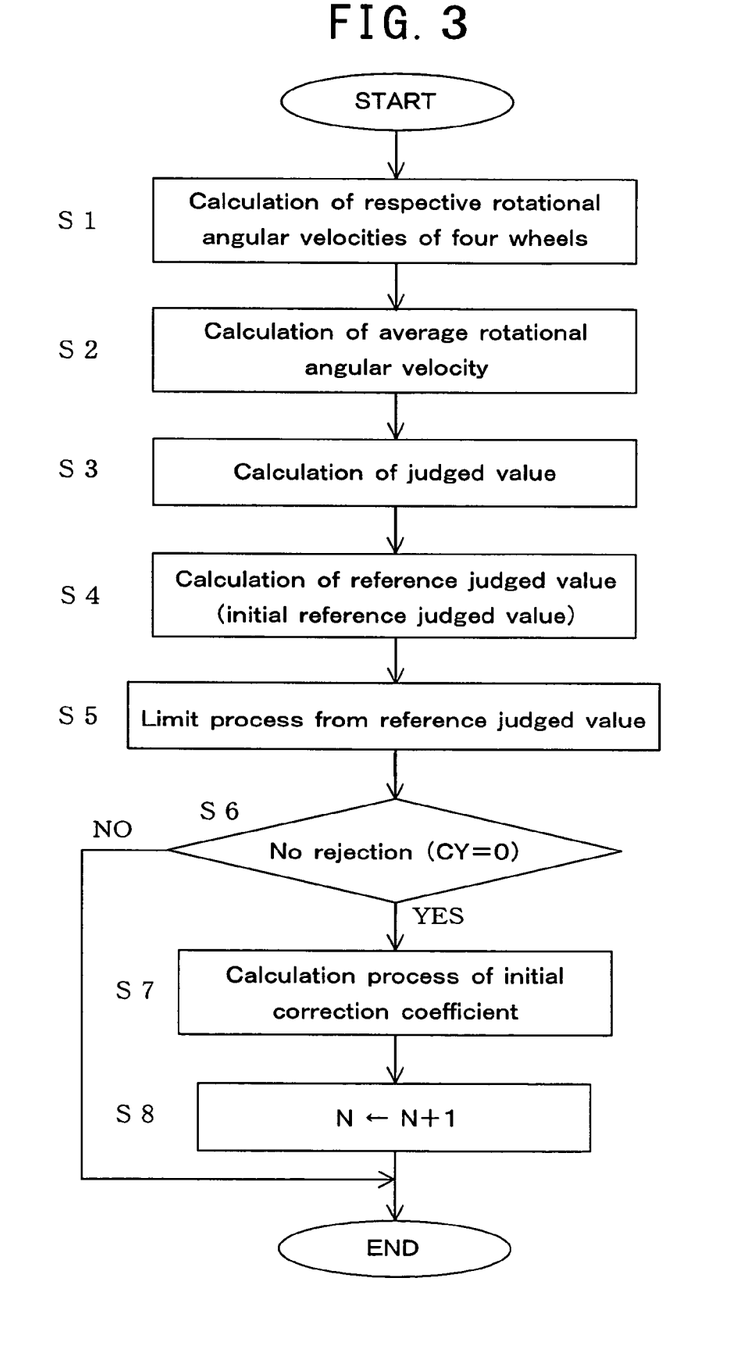
FIG. 3 illustrates one example of a flowchart of an apparatus for calculating an initial correction coefficient according to the present embodiment.

Steps (1) to (5) of operations of the apparatus for calculating an initial correction coefficient according to the present embodiment will now be explained on the basis of FIGS. 3 and 4.

(1) Respective rotational angular velocities F1, F2, F3 and F4 of four wheel tires FL, FR, RL and RR of a vehicle are calculated on the basis of outputs of rotational angular velocity detecting means, for instance, sensors such as ABS sensors (Step S1).

(2) An average rotational angular velocity is then calculated from the rotational angular velocities F1, F2, F3 and F4 (Step S2).

(3) A present judged value D is calculated by using the above equation (15) (Step S3).

(4) A reference judged value SD is calculated from the above equation (16) (Step S4).

(5) Limit processes of the judged value from the reference judged value are then performed (Step S5).

Figure 4:
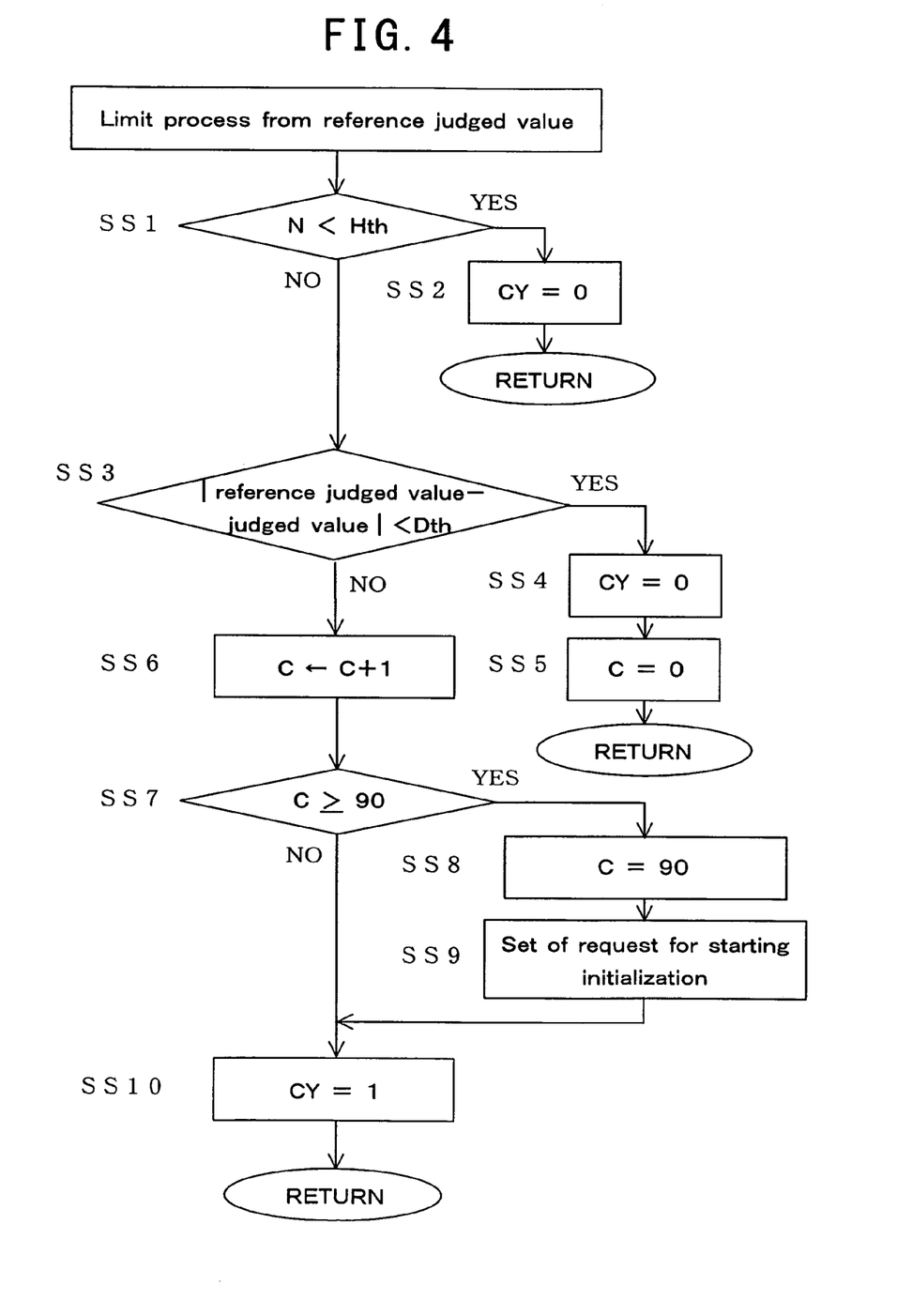
FIG. 4 illustrates one example of a flowchart of limit processes in the apparatus for calculating an initial correction coefficient.

(i) In the limit processes, it is judged whether the number of counts N of the initialization completion percentage counter is less than a specified threshold Hth, for instance, 10, prior to performing identification processes as illustrated in FIG. 4 (Step SS1). When it has been consequently judged that the number of counts N is less than the threshold, no identification processes are performed (execution of identification processes is prohibited) since it is determined that the accuracy of the reference judged value is still insufficient, and calculation of an initial reference judged value is directly performed. More particularly, when the number is less than 10, a carry flag (CY) is set to zero (Step SS2) whereupon the number of counts N is incremented by "1" without performing processes for calculating the initial correction coefficient (Step S7), and the number of times of calculation of the initial reference judged value is recorded (Step S8).

(ii) Next, when the number of counts N is not less than the specified threshold Hth (for instance, 10), the initial reference judged value is set in the identifying means as a reference judged value which is used at first, whereupon the program proceeds to Step SS3 for judging whether | reference judged value−judged value | is less than a threshold for limit process Dth from the reference judged value, for instance, 0.08. When it is determined that this value is less than the threshold Dth, that is, when it is identified that the vehicle is performing straight-ahead running or turning movements at mid/low velocity, the carry flag (CY) is set to zero (Step SS4) whereupon a count value C of an initialization abnormality detecting counter for identifying that the vehicle is performing turning movements at high velocity is cleared (Step SS5) and calculation processes of the initial correction coefficient is performed (Step S7) without rejecting data (Step S6). The number of counts N is incremented by "1", and the number of times of calculation of the initial reference judged value is recorded (Step S8).

(iii) When the above value of | reference judged value−judged value | is not less than the threshold value Dth, that is, when it is identified that the vehicle is performing turning movements at high velocity, the count value C of the initialization abnormality detecting counter is incremented by "1" (Step SS6).

(iv) Next, it is judged whether the count value C is not less than a specified threshold Cth, for instance, 90 (Step SS7). When it is consequently determined that the count value C is not less than the threshold Cth, it might be a case where the reference judged value has been obtained on the basis of a judged value obtained when the vehicle is performing turning movements at high velocity, so that the count value C is set to the threshold Cth and a request for starting initialization is set (Steps SS8, SS9). The carry flag (CY) is then set to 1 so as not to perform calculation processes of the stored initial correction coefficient just for once (Step SS10). On the other hand, when it is determined that the count value C is less than the threshold Cth, the carry flag (CY) is simply set to 1 (Step SS10). When the data during turning movements at high velocity are then rejected as a result of limit processes, the program repeats alls steps starting from Step S1.

The present invention will now be explained on the basis of an example thereof, while the present invention is not limited to such an example only.

EXAMPLE

A FF (front engine/front drive) vehicle mounted with tires of normal air-pressure ($2.2 \times 10^5$ Pa) was prepared as a vehicle. The tire size of the tire was 205/60R16. An oval course was employed as a running course. The running conditions employed for the vehicle were such that the vehicle was repeatedly made to run at 50 km/h on a straight course and then on a turning course at 50 km/h and another straight course at 100 km/h and a turning course at 100 km/h.

Figure 5:
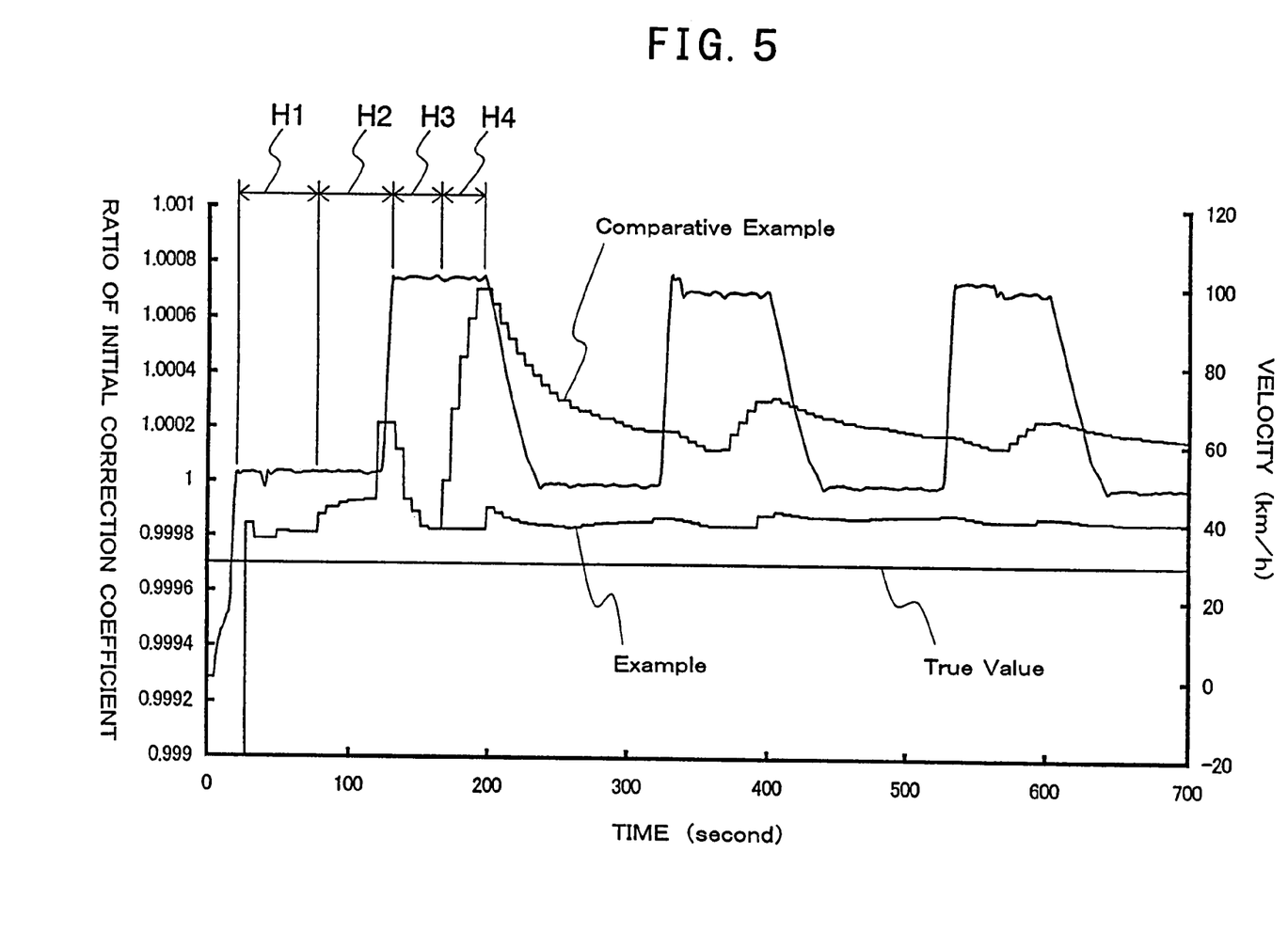
FIG. 5 is a view illustrating a time passage of a ratio between initial correction coefficients of front wheels and rear wheels K1/K2.

It is generally known that a ratio between the initial correction coefficient K1 of the front wheels and the initial correction coefficient K2 of the rear wheels differs depending on the time of performing straight-ahead running and turning movements. The present example has thus been devised to check the ratio between the initial correction coefficient K1 of the front wheels and the initial correction coefficient K2 of the rear wheels K1/K2 as an index for representing a magnitude of effects. The results are shown in FIG. 5. In FIG. 5, the present example represents a ratio of calculated initial correction coefficients K1/K2 in which data obtained during turning movements at high velocity have been rejected through limit processes by using the apparatus for calculating an initial correction coefficient according to the above embodiment while the comparative example represents a ratio of initial correction coefficients K1/K2 which has been calculated by a conventional apparatus for calculating an initial correction coefficient. For purpose of comparison, a ratio of initial correction coefficients K1/K2 (true value) which has been calculated on the basis of data when the vehicle was made to run on a straight course at 50 km/h has also been checked. In this respect, for easier understanding of the running conditions of the vehicle, straight-ahead running at 50 km/h H1, turning movements at 50 km/h H2, straight-ahead running at 100 km/h H3 and turning movements at 100 km/h H4 are illustrated in FIG. 5.

It can be understood from FIG. 5 that the ratio of initial correction coefficients K1/K2 of the present example is approaching the true value. In contrast thereto, it can be understood that the ratio of initial correction coefficients K1/K2 of the comparative example is largely deviated from the true value. The present invention is accordingly capable of obtaining accurate initial correction coefficients also when the vehicle is running is on an oval course in the same direction.

As explained so far, according to the present invention, it is possible to obtain accurate correction coefficients so that it is possible to accurately detect, for instance, a decrease in tire air-pressure and thus to maintain safe running.

What is claimed is:

1. An apparatus for calculating an initial correction coefficient, the apparatus being used for (1) detecting decrease in tire air-pressure or (2) calculating a slip rate and being arranged to calculate initial correction coefficients for correcting rotational angular velocities obtained from outputs of rotational angular velocity detecting means which are respectively provided in connection with four tires mounted to a vehicle and comprising:

a judged value calculating means which calculates a judged value, on the basis of the rotational angular velocities, for determining whether an air-pressure of a tire has decreased;

an identifying means which identifies, on the basis of the judged value, whether the vehicle is performing turning movements at high velocity, straight-ahead running or turning movements at mid/low velocity; and an initial correction coefficient calculating means which obtains an initial correction coefficient for eliminating a difference between effective rolling radii owing to initial differences between respective tires from the rotational angular velocities, when it has been identified by the identifying means that the vehicle is performing straight-ahead running or turning movements at mid/low velocity, wherein the identifying means includes a limit processing means which judges whether a difference or a ratio between the calculated judged value and a previously obtained reference judged value is less than a preliminarily obtained threshold or not and a running determining means which determines, when it is determined that the value of the difference or the ratio is less than the threshold, that the vehicle is performing straight-ahead running or turning movements at mid/low velocity, wherein the apparatus further includes:

a reference judging means in which a judged value obtained by performing averaging processes on the basis of the calculated judged value and the previously obtained judged value is used as the reference judged value employed in the identifying means;

a judged value replacing means which regards the reference value obtained by performing averaging processes on the basis of the judged value and a previously obtained judged value as an initial reference judged value, prior to performing identifying processes in the identifying means;

a first storing means which stores the number of times of calculation of the initial reference judged values; a number judging means which judges whether the number of times of calculation is less than a preliminary set threshold;

an execution prohibiting means which performs only processes for obtaining the initial reference judged value but prohibits execution of identifying processes by the identifying means when it is determined that the number of times of calculation is less than the threshold; and a setting means which sets the initial reference judged value as a reference judged value which is first used in the identifying means; and wherein the identifying means includes (1) a second storing means which stores a number of times of identification in which it is identified that the vehicle is performing turning movements at high velocity, (2) an identification number judging means which judges whether the number of times of identification is not less than a preliminary determined threshold or not, and (3) an initialization executing means which initializes the initial correction coefficient when it is determined that the number of times of identification is not less than the threshold.

2. A method for calculating an initial correction coefficient, the method being applicable to an apparatus for (1) detecting decrease in tire air-pressure or (2) calculating a slip rate, in which initial correction coefficients for correcting rotational angular velocities obtained from outputs of rotational angular velocity detecting means which are respectively provided in connection with four tires mounted to a vehicle are calculated, the method comprising the steps of:

calculating a judged value, on the basis of the rotational angular velocities, for determining whether an air-pressure of a tire has decreased;

identifying, on the basis of the judged value, whether the vehicle is performing turning movements at high velocity, straight-ahead running or turning movements at mid/low velocity;

obtaining an initial correction coefficient for eliminating a difference between effective rolling radii owing to initial differences between respective tires from the rotational angular velocities, when it has been identified by the identifying means that the vehicle is performing straight-ahead running or turning movements at mid/low velocity, wherein the identifying step includes the steps of judging whether a difference or a ratio between the calculated judged value and a previously obtained reference judged value is less than a preliminarily obtained threshold or not, and of determining, when it is determined that the value of the difference or the ratio is less than the threshold, that the vehicle is performing straight-ahead running or turning movements at mid/low velocity;

employing a reference judging means in which a judged value obtained by performing averaging processes on the basis of the calculated judged value and the previously obtained judged value is used as the reference judged value employed in the identifying means;

employing a judged value replacing means which regards the reference value obtained by performing averaging processes on the basis of the judged value and a previously obtained judged value as an initial reference judged value, prior to performing identifying processes in the identifying means;

employing a first storing means which stores the number of times of calculation of the initial reference judged values; a number judging means which judges whether the number of times of calculation is less than a preliminary set threshold;

employing an execution prohibiting means which performs only processes for obtaining the initial reference judged value but prohibits execution of identifying processes by the identifying means when it is determined that the number of times of calculation is less than the threshold; and employing a setting means which sets the initial reference judged value as a reference judged value which is first used in the identifying means; and wherein the identifying means employs (1) a second storing means which stores a number of times of identification in which it is identified that the vehicle is performing turning movements at high velocity, (2) an identification number judging means which judges whether the number of times of identification is not less than a preliminary determined threshold or not, and (3) an initialization executing means which initializes the initial correction coefficient when it is determined that the number of times of identification is not less than the threshold.

3. A computer-readable medium carrying a program for calculating an initial correction coefficient, the program being applicable to an apparatus for (1) detecting decrease in tire air-pressure or (2) calculating a slip rate, wherein for calculating initial correction coefficients for correcting rotational angular velocities obtained from outputs of rotational angular velocity detecting means which are respectively provided in connection with four tires mounted to a vehicle, the program, when executed, causing a computer to function as a judged value calculating means which calculates a judged value, on the basis of the rotational angular velocities, for determining whether an air-pressure of a tire has decreased, an identifying means which identifies, on the basis of the judged value, whether the vehicle is performing turning movements at high velocity, straight-ahead running or turning movements at mid/low velocity, and an initial correction coefficient calculating means which obtains an initial correction coefficient for eliminating a difference between effective rolling radii owing to initial differences between respective tires from the rotational angular velocities, when it has been identified by the identifying means that the vehicle is performing straight-ahead running or turning movements at mid/low velocity, and further as a limit processing means which judges whether a difference or a ratio between the calculated judged value and a previously obtained reference judged value is less than a preliminarily obtained threshold or not, and a running determining means which determines, when it is determined that the value of the difference or the ratio is less than the threshold, that the vehicle is performing straight-ahead running or turning movements at mid/low velocity, wherein the apparatus further includes:

a reference judging means in which a judged value obtained by performing averaging processes on the basis of the calculated judged value and the previously obtained judged value is used as the reference judged value employed in the identifying means;

a judged value replacing means which regards the reference value obtained by performing averaging processes on the basis of the judged value and a previously obtained judged value as an initial reference judged value, prior to performing identifying processes in the identifying means;

a first storing means which stores the number of times of calculation of the initial reference judged values; a number judging means which judges whether the number of times of calculation is less than a preliminary set threshold;

an execution prohibiting means which performs only processes for obtaining the initial reference judged value but prohibits execution of identifying processes by the identifying means when it is determined that the number of times of calculation is less than the threshold; and a setting means which sets the initial reference judged value as a reference judged value which is first used in the identifying means; and wherein the identifying means includes (1) a second storing means which stores a number of times of identification in which it is identified that the vehicle is performing turning movements at high velocity, (2) an identification number judging means which judges whether the number of times of identification is not less than a preliminary determined threshold or not, and (3) an initialization executing means which initializes the initial correction coefficient when it is determined that the number of times of identification is not less than the threshold.

* * * * *